US012605871B2

(12) United States Patent
Susa et al.

(10) Patent No.: US 12,605,871 B2
(45) Date of Patent: *Apr. 21, 2026

(54) INJECTION MOLDING MACHINE AND METHOD OF OPERATING THE SAME

(71) Applicant: The Japan Steel Works, Ltd., Tokyo (JP)

(72) Inventors: Keigo Susa, Shinagawa-ku (JP); Motomu Furumoto, Shinagawa-ku (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 105 days.

This patent is subject to a terminal disclaimer.

(21) Appl. No.: 18/540,431

(22) Filed: Dec. 14, 2023

(65) Prior Publication Data

US 2024/0198570 A1     Jun. 20, 2024

(30) Foreign Application Priority Data

Dec. 16, 2022     (JP) ................................. 2022-201305
Oct. 6, 2023     (JP) ................................. 2023-174532

(51) Int. Cl.
*B29C 45/64*          (2006.01)
*B29C 45/17*          (2006.01)
(Continued)

(52) U.S. Cl.
CPC ........ *B29C 45/641* (2013.01); *B29C 45/1742* (2013.01); *B29C 45/1756* (2013.01);
(Continued)

(58) Field of Classification Search
CPC ........... B29C 45/1747; B29C 45/2606; B29C 2045/645; B29C 2045/1764; B29C 2045/1788; B29C 2945/76006
See application file for complete search history.

(56) References Cited

U.S. PATENT DOCUMENTS 7,323,125 B2     1/2008  Uwaji et al.
7,387,506 B2 *   6/2008  Nagano ............... B29C 45/2606
                                                          425/589

(Continued)

FOREIGN PATENT DOCUMENTS

CN          108327198  A  *  7/2018
CN          118205161  A  *  6/2024   ......... B29C 45/1742
(Continued)

OTHER PUBLICATIONS

Machine translation CN-108327198-A, Jul. 27, 2018, FIT (Foreign Image and Text) (Year: 2018).*

(Continued)

*Primary Examiner* — Benjamin A Schiffman
(74) *Attorney, Agent, or Firm* — Foley & Lardner LLP

(57)     ABSTRACT

An injection molding machine has a clamp that generates electromagnetic force and that secures a moving plate or a fixed plate using attractive force that is produced by the electromagnetic force; a pressure sensor that is provided in the clamp, wherein the pressure sensor measures contact pressure that acts between the moving plate or the fixed plate and the clamp; and a controller for performing a measure to prevent detachment of the moving plate or the fixed plate based on the contact pressure.

24 Claims, 6 Drawing Sheets

(51) Int. Cl.

| | |
|---|---|
| *B29C 45/20* | (2006.01) |
| *B29C 45/26* | (2006.01) |
| *B29C 45/40* | (2006.01) |
| *B29C 45/76* | (2006.01) |

(52) U.S. Cl.

CPC .......... *B29C 45/1777* (2013.01); *B29C 45/20* (2013.01); *B29C 45/2602* (2013.01); *B29C 45/2606* (2013.01); *B29C 45/401* (2013.01); *B29C 45/7626* (2013.01); *B29C 45/7653* (2013.01); *B29C 2045/645* (2013.01); *B29C 2945/76006* (2013.01); *B29C 2945/76113* (2013.01); *B29C 2945/76157* (2013.01); *B29C 2945/7623* (2013.01); *B29C 2945/76505* (2013.01); *B29C 2945/76598* (2013.01); *B29C 2945/76709* (2013.01); *B29C 2945/76725* (2013.01)

(56) References Cited

U.S. PATENT DOCUMENTS

| | | | | |
|---|---|---|---|---|
| 7,871,255 | B2 * | 1/2011 | Kimura | .............. B29C 45/1742 |
| | | | | 425/186 |
| 11,426,901 | B2 * | 8/2022 | Akamatsu | .............. B29C 45/64 |
| 2024/0198569 | A1 * | 6/2024 | Susa | ....................... B29C 45/20 |
| 2024/0198570 | A1 | 6/2024 | Susa et al. | |

FOREIGN PATENT DOCUMENTS

| | | | | | |
|---|---|---|---|---|---|
| EP | | 3616871 | A1 * | 3/2020 | .......... B29C 31/006 |
| JP | | 2014097628 | A * | 5/2014 | |
| JP | | 2024086568 | A * | 6/2024 | ......... B29C 45/1742 |
| TW | | 1404618 | B * | 8/2013 | ............. B29C 33/32 |
| WO | WO-2019/202957 | A1 | | 10/2019 | |

OTHER PUBLICATIONS

Non-Final Office Action issued in U.S. Appl. No. 18/540,270 mailed Jun. 4, 2025.

* cited by examiner

Start mold opening

S1

Retaining force less than set value?
and/or
motor torque grater than set value?                    NO

YES

S2

Reduce mold-opening speed

S3

Retaining force and/or motor torque
within the set value?                       NO

YES

Mold opening completed

INJECTION MOLDING MACHINE AND METHOD OF OPERATING THE SAME

FIELD OF THE INVENTION

The present application is based on and claims priority from Japanese Patent Application Nos. 2022-201305, filed on Dec. 16, 2022 and 2023-174532, filed on Oct. 6, 2023, the disclosures of which are hereby incorporated by reference herein in their entireties.

The present disclosure relates to an injection molding machine and a method of operating the same.

DESCRIPTION OF THE RELATED ART

As the need for producing multiple products in smaller lots has been increasing recently, rapid replacement of molds is desired for an injection molding machine. WO2019/202957 discloses a magnetic clamp. The clamp includes a magnet having fixed polarities and a magnet having polarities that can be reversed by applying a current to a coil. Molds can be rapidly replaced by applying a current to the coil and thereby attracting the molds.

SUMMARY OF THE INVENTION

The retaining force of the clamp to retain the mold depends on the attractive force (electromagnetic force) of the clamp itself, as well as on various forces that are applied to the mold. The attractive force to attract the mold is measured by a dedicated search coil that is installed in the clamp. However, when a current is continuously applied to the search coil, the magnet is heated, whereby the magnetic force is reduced and the attractive force therefore cannot be measured continuously. As a result, it is difficult to appropriately measure changes in the retaining force during the operation of an injection molding machine.

The present disclosure aims at providing an injection molding machine that that allows appropriate measurement of changes in the retaining force of the mold during operation of the injection molding machine.

An injection molding machine of the present disclosure comprises: a pressure sensor that is provided in a clamp, wherein the pressure sensor measures contact pressure that acts between a plate and the clamp; and a controller for performing a measure to prevent detachment of the plate based on the contact pressure.

According to the present disclosure, it is possible to provide an injection molding machine that allows appropriate measurement of changes in the retaining force of the mold during operation of the injection molding machine.

The above and other objects, features, and advantages of the present invention will become apparent from the following description with reference to the accompanying drawings that illustrate examples of the present invention.

DESCRIPTION OF EMBODIMENTS

Overall Arrangement

Figure 1:
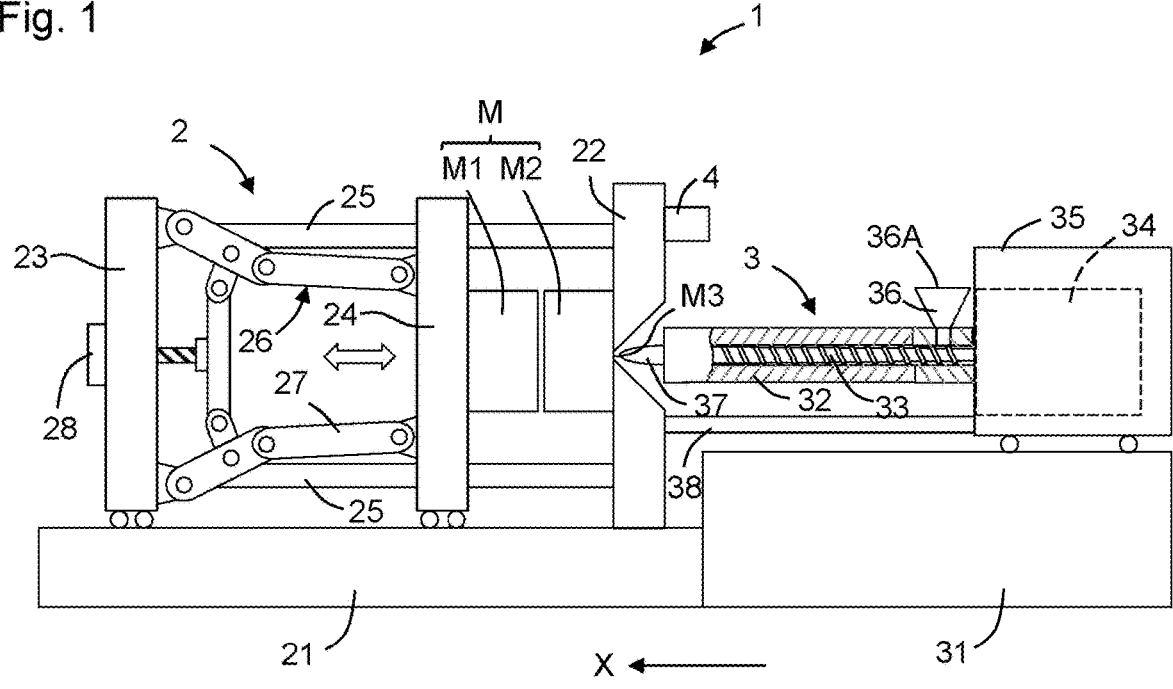
FIG. 1 is a schematic front view of an injection molding machine according to an embodiment.

FIG. 1 shows a schematic front view of injection molding machine 1 according to the present embodiment. Referring to FIG. 1, injection molding machine 1 is mainly comprised of clamping unit 2 for clamping a mold, injection unit 3 for heating and melting material to be injected and injecting the material, and controller 4. Controller 4 is provided to control the overall operation of injection molding machine 1, but in the description, functions that relate to the present embodiment will be mainly described. In the following descriptions, the direction in which screw 33 moves or the direction in which moving plate M1 moves is referred to as the X-direction. The X-direction is parallel to the horizontal direction. Moving plate M1 and fixed plate M2 may be referred to as mold M as a whole.

Clamping Unit 2

Clamping unit 2 is provided with fixed platen 22 that is fixed to bed 21 and to which fixed plate M2 is mounted, clamp housing 23 that can slide on bed 21, and moving platen 24 that can slide on bed 21 and to which moving plate M1 is mounted. Fixed platen 22 is connected to clamp housing 23 via tie bars 25. Clamping mechanism 26 for opening and closing mold M is provided between moving platen 24 and clamp housing 23. Clamping mechanism 26 includes toggle mechanism 27 and clamping motor 28 that drives toggle mechanism 27. Although not illustrated, clamping mechanism 26 may alternatively include a direct-pressure type clamping mechanism, i.e., a hydraulic clamping cylinder.

Injection Unit 3

Injection unit 3 is provided on base 31. Injection unit 3 is provided with cylinder 32, screw 33 that is housed in cylinder 32, and drive mechanism 34 for driving screw 33. Screw 33 is rotatably driven and is also driven in the X-direction by drive mechanism 34. Drive mechanism 34 is covered with cover 35. Hopper 36 for supplying material to be injected is provided near the rear end of cylinder 32. Hopper 36 is provided with material supply opening 36A from which material to be injected is supplied. At the front end of cylinder 32, injection nozzle 37 is provided that is pushed against fixed plate M2 to thereby supply material to be injected into cavity C (refer to FIG. 2A) that is formed by fixed plate M2 and moving plate M1.

Injection unit 3 includes nozzle touch mechanism 38. Nozzle touch mechanism 38 drives injection unit 3 forward such that injection nozzle 37 touches sprue bushing M3 of mold M. Nozzle touch mechanism 38 connects drive mechanism 34 to fixed platen 22. Nozzle touch mechanism 38 includes a toggle mechanism that uses a ball screw, but alternatively uses a mechanism having a hydraulic cylinder.

Configuration of Mold M

Figure 2A:
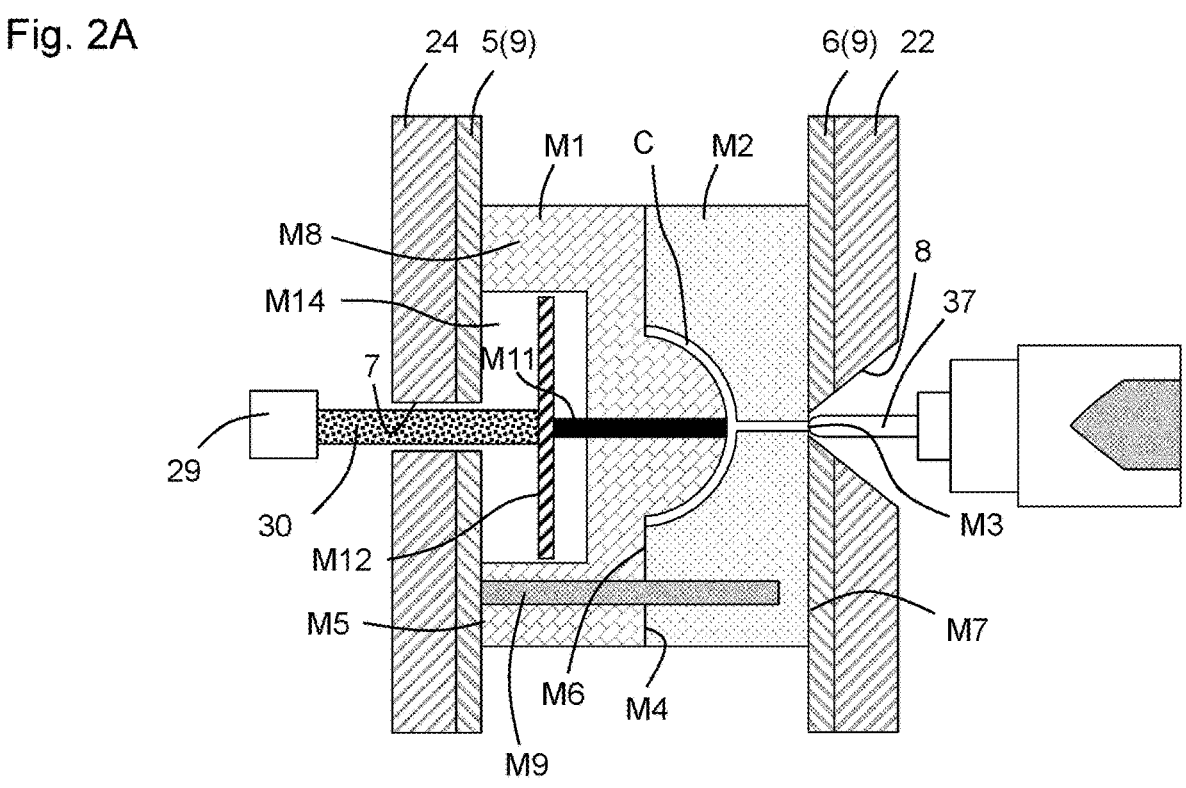
FIG. 2A is an exemplary sectional view illustrating a moving plate and a fixed plate when the mold is closed.
Figure 2B:
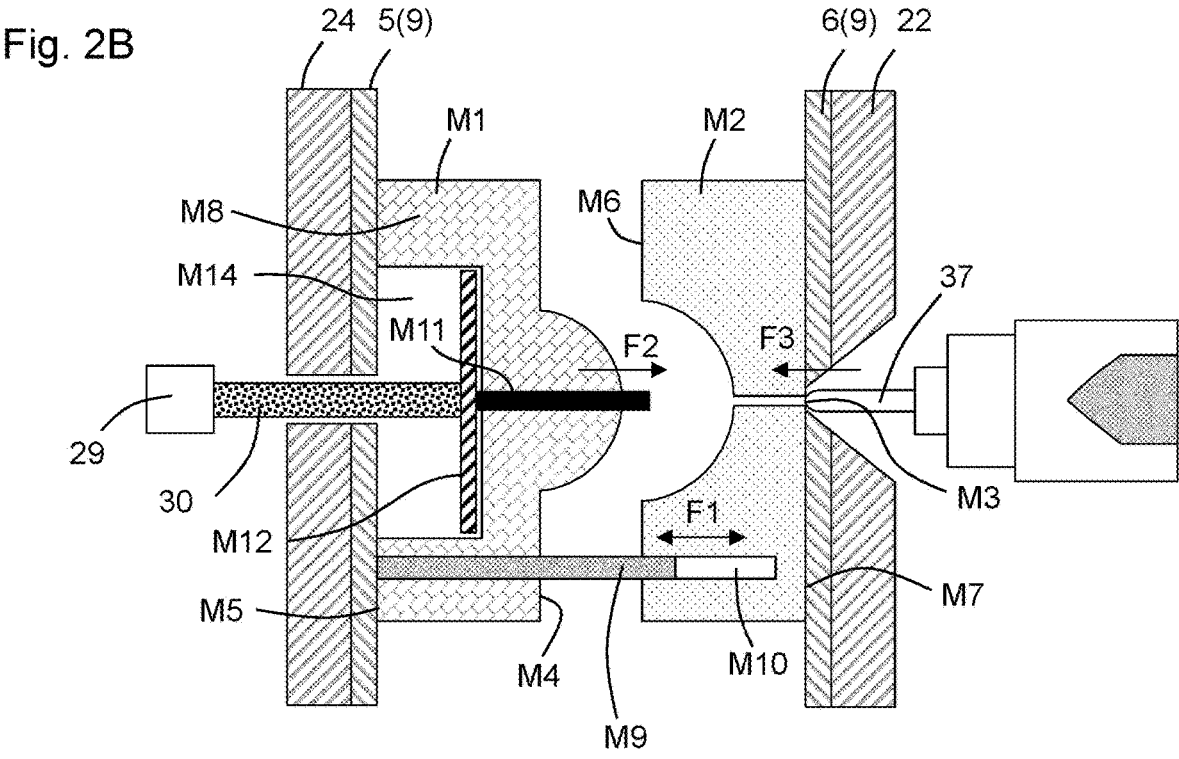
FIG. 2B is an exemplary sectional view illustrating a moving plate and a fixed plate when the mold is open.

FIGS. 2A and 2B are sectional views that illustrate exemplary moving plate M1 and fixed plate M2 in more detail. FIG. 2A shows moving plate M1 and fixed plate M2 when they are closed and FIG. 2B shows moving plate M1 and fixed plate M2 when they are open. Moving plate M1 has inner surface M4 that faces cavity C and outer surface M5 that is the back surface of inner surface M4. Fixed plate M2 has inner surface M6 that faces cavity C and outer surface M7 that is the back surface of inner surface M6. Inner surface M4 of moving plate M1 and inner surface M6 of fixed plate M2 face each other to form cavity C therebetween that is charged with material that is injected (for example, resin). Injection nozzle 37 for supplying the material to be injected to cavity C is pushed against fixed plate M2. As will be described later, injection nozzle 37 generates nozzle contact force.

Moving plate M1 has main body M8 that constitutes the contact surface that contacts fixed plate M2 (the parting line) and guide pin M9 that is supported by main body M8 and that protrudes from main body M8 toward fixed plate M2. Guide pin M9 is provided to locate moving plate M1 and fixed plate M2. Fixed plate M2 is provided with receiving bore M10 that receives guide pin M9. When moving plate M1 moves, guide pin M9 slides relative to receiving bore M10. Therefore, guide pin M9 is one example of sliding parts that slide relative to fixed plate M2. Guide pin M9 is provided at a part of inner surface M4 of moving plate M1 that is remote from cavity C. As will be described later, guide pin M9 generates mold-opening force.

Ejector pin M11 for pushing out a product from moving plate M1 is installed in moving plate M1. Ejector pin M11 penetrates through main body M8 of moving plate M1. Main body M8 of moving plate M1 is provided with cavity M14 that is open at outer surface M5, and ejector plate M12 is housed in cavity M14. Injection molding machine 1 has ejector pin drive mechanism 29 that drives ejector pin M11. Specifically, ejector pin drive mechanism 29 is connected to ejector rod 30 of injection molding machine 1, and ejector rod 30 penetrates through moving clamp 5 and moving platen 24 so as to push ejector plate M12. Ejector pin M11 is driven by ejector plate M12 that pushes ejector pin M11. As will be described later, ejector pin M11 generates ejector pin reactive force.

Configuration of the Clamps

Moving plate M1 is fixed to moving clamp 5, and moving clamp 5 is directly mounted on moving platen 24 by means of attachment members such as bolts (not illustrated). Fixed plate M2 is fixed to fixed clamp 6, and fixed clamp 6 is directly mounted on fixed platen 22 by means of attachment members such as bolts (not illustrated). In the following description, these clamps are referred to as clamp 9 when it is not necessary to distinguish moving clamp 5 and fixed clamp 6. An intermediate plate may be interposed between moving platen 24 and clamp 9 or between fixed platen 22 and clamp 9.

Clamp 9 generates electromagnetic force and secures moving plate M1 or fixed plate M2 by attractive force that is produced by the electromagnetic force. Moving platen 24 and moving clamp 5 are provided with through-hole 7 through which ejector pin M11 is inserted, and fixed platen 22 and fixed clamp 6 are provided with through-hole 8 that injection nozzle 37 enters.

Figure 3:
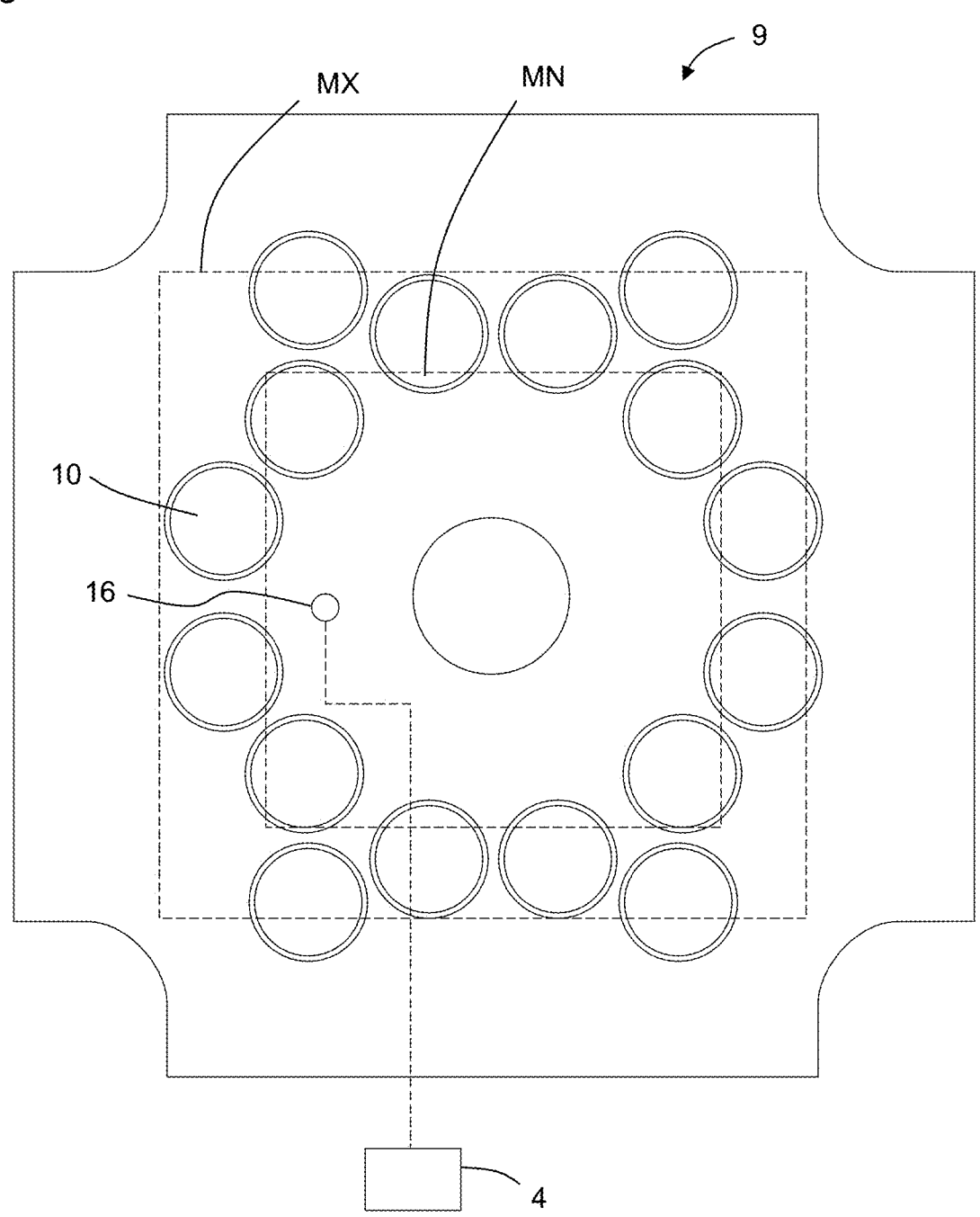
FIG. 3 is an exemplary plan view illustrating a clamp.

FIG. 3 shows a plan view of clamp 9. Moving clamp 5 and fixed clamp 6 have substantially the same configuration. Clamp 9 is provided with magnet blocks 10 that generate the attractive force that is produced by the electromagnetic force. Magnet blocks 10 generate the attractive force when magnet blocks 10 contact mold M. For this reason, the number of magnet blocks 10 that generate the attractive force depends on the size of mold M or the location at which mold M is mounted. Broken lines MX show the perimeter of mold M having the largest mountable size, and broken lines MN show the perimeter of mold M having the smallest mountable size.

Operation Principle of Clamp 9

Figures 4A, 4B:
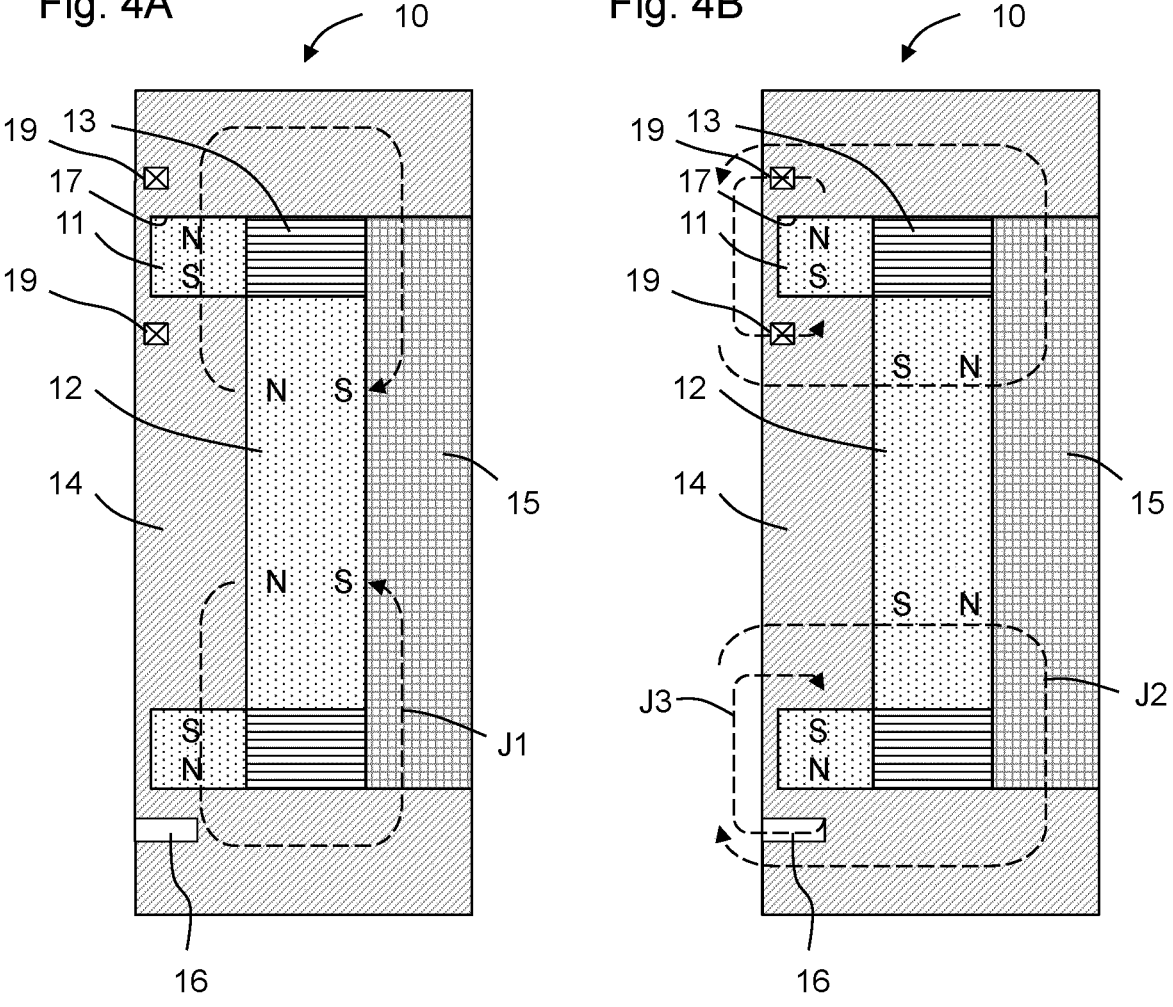
FIGS. 4A and 4B are conceptual views illustrating the operation principle of the clamp.

FIGS. 4A and 4B show the operation principle of clamp 9. FIG. 4A shows a state in which the attractive force of magnet block 10 is not generated (hereinafter referred to as a nonmagnetized state). FIG. 4B shows a state in which the attractive force of magnet block 10 is generated (hereinafter referred to as a magnetized state). The operation principle is common to moving clamp 5 and fixed clamp 6.

Magnet block 10 includes magnetically pinned magnet 11 whose magnetization direction (magnetic poles) is pinned, magnetically variable magnet 12 whose magnetization direction (magnetic poles) changes depending on the direction in which a current is applied to coil 13, support plate 14, and yoke 15. FIGS. 4A and 4B each show two sections of one magnetically pinned magnet 11 and two sections of one coil 13. Magnetically pinned magnet 11 is ring-shaped with the inner circumference magnetized to the S-pole and the outer circumference magnetized to the N-pole. Magnetically pinned magnet 11 is fitted into groove 17 of support plate 14. Magnetically variable magnet 12 is a circular plate having two main surfaces that are opposite to each other. Ring-shaped coil 13 is arranged around magnetically variable magnet 12.

Magnetically variable magnet 12 is magnetized such that one of the two main surfaces is the N-pole and the other is the S-pole (or vice versa) depending on the direction in which a current is applied to coil 13.

Referring to FIG. 4A, in the nonmagnetized state, the magnetic pole of magnetically pinned magnet 11 and the magnetic pole of magnetically variable magnet 12 that are adjacent to each other have different polarities. Magnetic flux J1 that passes through magnetically variable magnet 12, support plate 14, magnetically pinned magnet 11, support plate 14, and then yoke 15 is generated inside clamp 9. Little magnetic flux J1 leaks to the outside of clamp 9 and no force that attracts mold M is generated. The operation to mount or remove mold M is performed in this state.

Referring to FIG. 4B, in the magnetized state, a current is applied to coil 13 and the magnetic pole of magnetically pinned magnet 11 and the magnetic pole of magnetically variable magnet 12 that are adjacent to each other have the same polarity. In the case of FIG. 4B, the magnetic pole of magnetically variable magnet 12 that faces magnetically pinned magnet 11 changes from the N-pole to the S-pole. Magnetic flux J2 that is generated by magnetically variable magnet 12 passes outward of magnetic flux J3 that is generated by magnetically pinned magnet 11, and magnetic fluxes J2 and J3 leak to the outside of clamp 9. In this manner, the attractive force that is produced by the electromagnetic force is generated and mold M is thereby fixed to clamp 9. Products are manufactured in this state.

Application of a current to coil 13 is performed such that the intensity of the magnetic field that is generated by coil 13 is smaller than the coercive force of magnetically pinned magnet 11 and greater than the coercive force of magnetically variable magnet 12. Therefore, the magnetization direction of magnetically pinned magnet 11 is fixed regardless of whether a current is applied to coil 13. On the other hand, magnetically variable magnet 12 maintains its magnetization state due to the coercive force once the magnetization is reversed. Therefore, a current may be applied only for a short time that is enough to reverse the magnetization. The application of the current is stopped after the magnetization is reversed. The configuration of magnetically pinned magnet 11 and magnetically variable magnet 12 is not limited to this example. Any configuration may be used as long as the magnetic pole of magnetically variable magnet 12 can be reversed by applying a current to coil 13 and the state in which magnetic flux leaks to the outside of clamp 9 and the state in which magnetic flux does not leak to the outside of clamp 9 can be switched.

Pressure Sensor

As illustrated in FIGS. 3, 4A, and 4B, injection molding machine 1 (refer to FIG. 1) has pressure sensor 16 that is provided in clamp 9. Pressure sensor 16 measures contact pressure that acts between moving plate M1 or fixed plate M2 and clamp 9 that are shown in FIGS. 2A and 2B. Pressure sensor 16 is connected to controller 4, and the contact pressure that is measured by pressure sensor 16 is inputted to controller 4. Controller 4 may obtain the retaining force of clamp 9 by multiplying the contact pressure that is measured by pressure sensor 16 by the contact area between moving plate M1 or fixed plate M2 and clamp 9.

The contact area mentioned above may be obtained by using search coils 19 (refer to FIGS. 4A and 4B) that are each incorporated in each of magnet blocks 10 of clamp 9. Each search coil 19 is used to measure the attractive force of each magnet block 10 and may be used when a mold is mounted or removed in the present embodiment. The judgment of whether magnet block 10 that is combined with each search coil 19 is in contact with mold M may be made based on an induced current that is induced in search coil 19 or an induced voltage that is induced in search coil 19. The contact area between moving plate M1 or fixed plate M2 and clamp 9 may be obtained by summing up the contact areas of magnet blocks 10 that are in contact with mold M. Alternatively, the contact area may be inputted to controller 4 as a predetermined value (a constant value) that depends on the shape or the size of mold M.

Although one pressure sensor 16 is provided in the present embodiment, more than one pressure sensor 16 may be provided to enhance the measurement accuracy. When more than one pressure sensor 16 are provided, the average value of the contact pressure may be used for various controls described later, or the minimum value of the contact pressure may be used for various controls described later. However, irrespective of the number of pressure sensors 16, at least one pressure sensor 16 is preferably provided within mounting area MN of a mold having the minimum mountable size, i.e., at a position closer to the center of clamp 9 than any magnet block 10. In this manner, the contact pressure can be measured by at least one pressure sensor 16 no matter what type of mold is mounted.

The retaining force may be obtained by detecting magnetic flux that is generated in clamp 9 by means of search coil 19. However, this method requires supplying a current to search coil 19. The current may heat magnetically pinned magnet 11 and magnetically variable magnet 12 (refer to FIGS. 4A and 4B) and thereby reduce the intensity of the magnetic field of magnetically pinned magnet 11 and magnetically variable magnet 12. Therefore, this method can only be used at a timing when mold M is mounted or removed, and this method does not readily allow continuous measurement of the retaining force during the molding process. As will be described later, mold M is more likely to detach from clamp 9 in the mold-opening step or when the ejector pin is operated, and effective use of search coil 19 to prevent the detachment of the mold is therefore limited. Pressure sensor 16, which is free of this problem, can continuously measure the contact pressure or the retaining force during the molding process.

Forces Applied to Mold M

Next, the forces that are applied to mold M during the molding process will be described with reference mainly to FIGS. 2A, 2B, 5A, and 5B. The separation force is a force that is applied in the direction to separate mold M from clamp 9 and that is directed in the direction that cancels the retaining force. The retaining force is obtained by subtracting the separation force from the sum of the attractive forces that attract mold M based on the electromagnetic force and the pushing force from the opposing plate. The retaining force is a force that substantially retains mold M and is proportional to the contact pressure. The moving plate separation force is a separation force that is applied in the direction to separate moving plate M1 from moving clamp 5. The fixed plate separation force is a separation force that is applied in the direction to separate fixed plate M2 from fixed clamp 6.

Figure 5A:
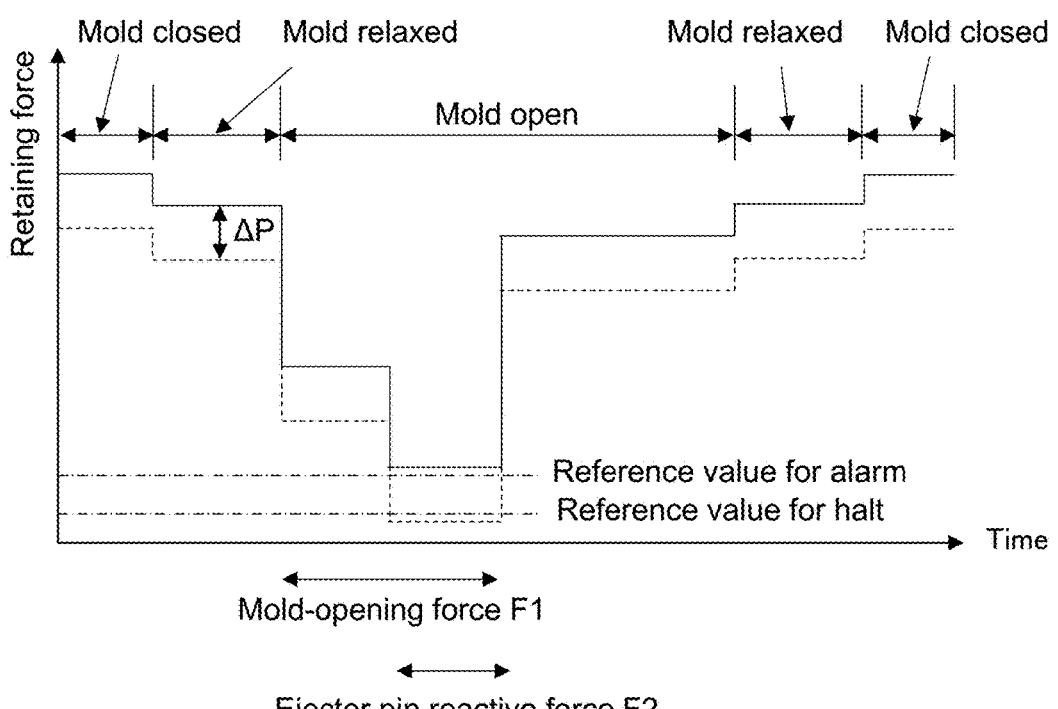
FIG. 5A is a conceptual view illustrating the force acting on the moving plate during a molding process.

FIG. 5A conceptually shows the retaining force that acts on moving plate M1 during one molding process. One molding process is a period from the start of the operation to release the closed-mold state (the state in which mold M is completely closed) to the completion of the operation to close the mold again. In the closed-mold state, moving plate M1 pushes fixed plate M2 and moving plate M1 receives reactive force of the same magnitude from fixed plate M2. This reactive force acts in the direction to push moving plate M1 against moving clamp 5. Since moving plate M1 receives the moving plate attractive force from moving clamp 5, the retaining force is the sum of the reactive force and the moving plate attractive force.

First, clamping motor 28 is activated in the closed-mold state. Toggle mechanism 27 is unlocked and the closed-mold state is slightly relaxed. The reactive force from fixed plate M2 decreases and the retaining force thereby decreases. The decrease in the retaining force is the same as the decrease in the reactive force. In this stage, moving plate M1 is retained by moving clamp 5 with sufficient retaining force and moving plate M1 is unlikely to detach from moving clamp 5.

When main body M8 of moving plate M1 is separated from fixed plate M2, the reactive force (the pushing force) that main body M8 receives from moving plate M1 is lost. However, moving plate M1 receives pulling force from fixed plate M2 due to friction that is caused by the slide movement between guide pin M9 and receiving bore M10. The separation force, i.e., the pulling force that is generated in moving plate M1 by a sliding part (guide pin M9) is referred to as mold-opening force F1 (refer to FIG. 2B). Mold-opening force F1 acts in the direction to separate moving plate M1 from moving clamp 5. For these reasons, the retaining force of moving plate M1 is greatly reduced.

Next, ejector pin M11 is operated to remove the product (not illustrated). When the product is detached from inner surface M4 of moving plate M1, moving plate M1 receives pulling force from the product. This pulling force also acts in the direction to separate moving plate M1 from moving clamp 5. The separation force, i.e., the pulling force that is generated in moving plate M1 by ejector pin M11 when ejector pin M11 is operated is referred to as ejector pin reactive force F2 (refer to FIG. 2B). It should be noted that although ejector pin reactive force F2 is shown as a constant value in FIG. 5A, ejector pin reactive force F2 actually often varies with time.

As illustrated in FIG. 5A, when both mold-opening force F1 and ejector pin reactive force F2 are applied simultaneously, the retaining force further decreases. The timing at which ejector pin reactive force F2 is applied is not limited to the timing illustrated in the figure, and, for example, ejector pin reactive force F2 may be applied when mold-opening force F1 is not applied.

Figure 5B:
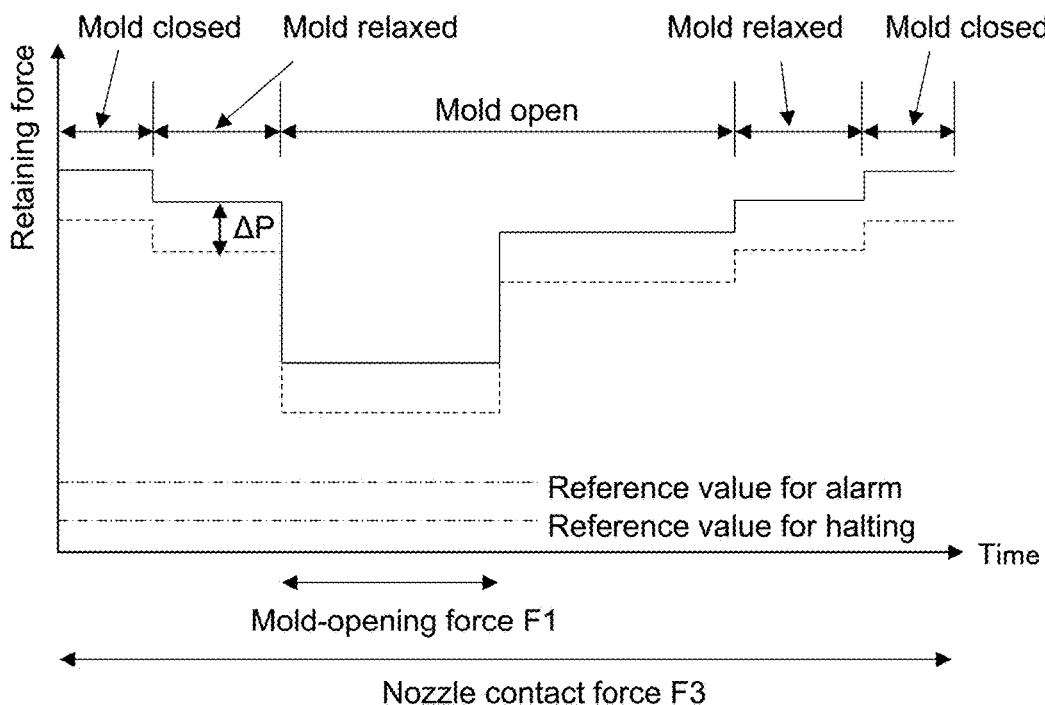
FIG. 5B is a conceptual view illustrating the force acting on the fixed plate during a molding process.

FIG. 5B conceptually shows the retaining force that acts on fixed plate M2 during one molding process. The retaining force of fixed plate M2 is substantially the same as the retaining force of moving plate M1. In the closed-mold state, fixed plate M2 is pushed by moving plate M1, and when toggle mechanism 27 is unlocked, the retaining force slightly decreases. When main body M8 of moving plate M1 is subsequently separated from fixed plate M2, the pushing force is lost.

Further, fixed plate M2 receives pulling force (mold-opening force F1) from moving plate M1 due to the friction that is caused by the slide movement between guide pin M9 and receiving bore M10. In addition, fixed plate M2 receives separation force that is generated by injection nozzle 37. This separation force is referred to as nozzle contact force F3 (refer to FIG. 2B). Nozzle contact force F3 includes not only the force that is directly caused by injection nozzle 37 that is pushed against fixed plate M2 but also the force that is caused by resin that leaks from injection nozzle 37 and thereby applied to fixed plate M2.

The principle of generating nozzle contact force F3 depends on the mechanism for driving nozzle touch mechanism 38. In the case of motor-driven nozzle touch mechanism 38, nozzle contact force F3 is generated by the resilient force of a spring (not illustrated) that pushes injection nozzle 37. Nozzle contact force F3 is also generated by braking nozzle touch mechanism 38 is being operated (while motor torque is being applied). In the case of hydraulic nozzle touch mechanism 38, nozzle contact force F3 is generated by the pressure in the cylinder.

Control of the Retaining Force of the Mold by Controller 4

Next, referring to FIGS. 1, 2A, and 2B, the operation principle of controller 4 will be described. When the retaining force of moving plate M1 is lost, moving plate M1 is more likely to detach from moving clamp 5. When the retaining force of fixed plate M2 is lost, fixed plate M2 is more likely to detach from fixed clamp 6. Therefore, controller 4 obtains the retaining force from the contact pressure that is measured by pressure sensor 16 (refer to FIG. 3) and takes measures to prevent the detachment of moving plate M1 or fixed plate M2 based on the retaining force. Since the contact area is constant, controller 4 may use the contact pressure instead of the attractive force.

The measures to prevent the detachment include using controller 4 to control injection molding machine 1 such that the separation force that acts on moving plate M1 or fixed plate M2 is less than the retaining force. As described previously, the chief separation forces that are applied to moving plate M1 are mold-opening force F1 and ejector pin reactive force F2, and the chief separation forces that are applied to fixed plate M2 are mold-opening force F1 and nozzle contact force F3. Therefore, controller 4 controls these forces F1 to F3.

Controller 4 controls at least one of clamping mechanism 26, ejector pin drive mechanism 29, and nozzle touch mechanism 38 such that the separation force is less than the retaining force. In addition, controller 4 controls injection molding machine 1 to perform the molding process while reducing the possibility of detachment of mold M in this manner. In this step, controller 4 may output information indicating that the separation force is controlled. The information may be outputted by display on a screen of controller 4, by voice, by signals, and the like, but the manner of the output is not limited.

Controller 4 controls clamping mechanism 26 of moving plate M1 such that mold-opening force F1 is less than the retaining force. Controller 4 preferably controls clamping mechanism 26 and ejector pin drive mechanism 29 of moving plate M1 such that the sum of mold-opening force F1 and ejector pin reactive force F2 is less than the retaining force. Furthermore, controller 4 preferably controls clamping mechanism 26 and nozzle touch mechanism 38 such that the sum of mold-opening force F1 and nozzle touch force F3 is less than the retaining force.

More specifically, controller 4 controls the mold-opening speed of moving plate M1. This control is effected because the friction force between guide pin M9 and receiving bore M10 that determines mold-opening force F1 is believed to correlate with the relative speed between guide pin M9 and receiving bore M10. Controller 4 further controls the speed of ejector pin M11. This control is effected because the detaching force between the product and the inner surface of moving plate M1 that determines ejector pin reactive force F2 is believed to correlate with the relative speed between ejector pin M11 and moving plate M1.

Nozzle contact force F3 is controlled by controlling the position of injection nozzle 37 in the X-direction relative to fixed plate M2. In order to decrease nozzle contact force F3, injection nozzle 37 is moved backward from fixed plate M2 for some seconds at the time of or before the operation to open the mold is started. In order to increase nozzle contact force F3, injection nozzle 37 is moved forward toward fixed plate M2. In order to set nozzle contact force F3 to zero, injection nozzle 37 is separated from fixed plate M2. In order to generate nozzle contact force F3 again, injection nozzle 37 is moved forward again toward fixed plate M2 after the mold is closed such that injection nozzle 37 touches fixed plate M2.

Figures 6, 7:
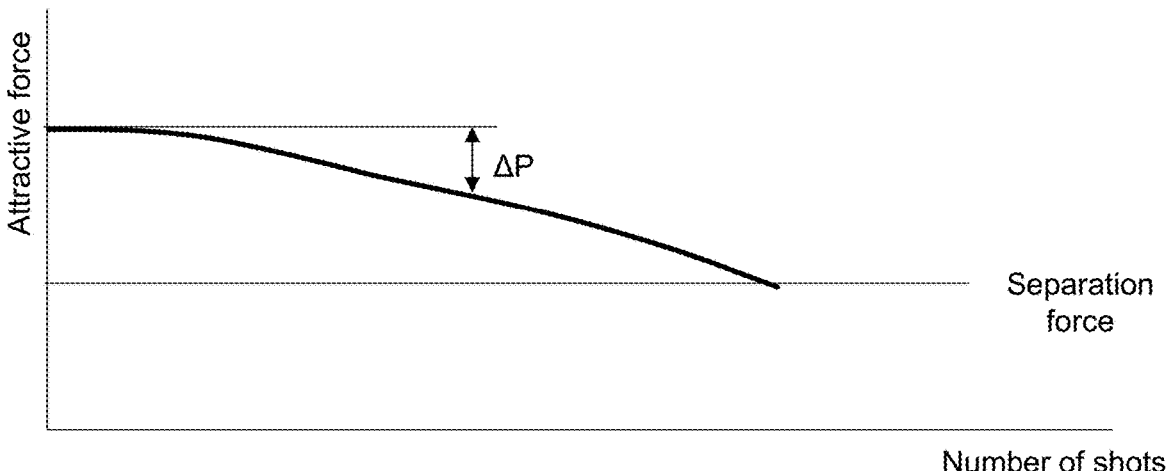
FIG. 6 is a conceptual view showing temporal change of the attractive force.
FIG. 7 is a schematic flowchart showing a method of controlling the retaining force using feedback control.

FIG. 6 conceptually illustrates the temporal change of the attractive force. The horizontal axis shows the number of shots of an injection molding machine (the number of repeated molding processes). As the number of shots increases, the temperature of magnetically pinned magnet 11 and magnetically variable magnet 12 rises (refer to FIGS. 4A and 4B). The rise of the temperature causes reduction in the intensity of the magnetic field of magnetically pinned magnet 11 and magnetically variable magnet 12 and thereby reduces the attractive force (the retaining force) of clamp 9. Therefore, even when the attractive force of clamp 9 is sufficiently greater than the separation force at an early stage of the operation, the attractive force may be reduced to less than the separation force at a certain timing as the number of the shots increases. FIGS. 5A and 5B show as broken lines the temporal change of the retaining force when the number of the shots increases. The difference ΔP between the broken line and the solid line indicates the reduction in the retaining force that is caused by the rise of the temperature of clamp 9 and corresponds to ΔP that is shown in FIG. 6.

Pressure sensor 16 (refer to FIG. 3) measures the contact pressure preferably at a specific timing in the molding process. A change in the retaining force that is caused by heating can be extracted by measuring the contact pressure at a specific timing in each molding process. Thus, controller 4 can obtain the temporal change of the retaining force based on the contact pressure that is measured by pressure sensor 16. By displaying the temporal change of the retaining force on a screen of controller 4 or the like, an operator can predict the possibility of the detachment of the mold from clamp 9 and thus take appropriate measures.

The specific timing is not particularly limited, but any timing other than the mold-closing step is preferable because change in the contact pressure that is caused by heating is less apt to appear in the mold-closing step due to the influence of the pushing force of the opposite plate. For example, if the specific timing is the timing at which the mold is relaxed in FIGS. 5A and 5B, the influence of variation in mold-opening force F1, ejector pin reactive force F2, and nozzle contact force F3 can be eliminated. For example, if the specific timing is during the mold-opening step in FIGS. 5A and 5B, measurement can be performed in a state in which the retaining force is reduced.

The measures to prevent the detachment include using controller 4 to perform feedback control based on the temporal change of the retaining force such that the retaining force remains greater than the separation force. The feedback control allows continued operation of injection molding machine 1 even if the retaining force decreases with time.

FIG. 7 shows an example of the feedback control when, for example, the mold is open. First, controller 4 judges whether the retaining force is less than a set value (Step S1). The set value is not particularly limited but may be the same as the reference value for an alarm to be described later or may be greater than the reference value for the alarm. The judgment of whether the motor torque of clamping motor 28 is greater than a second set value may be used as an alternative or additional criterion. A rise in the motor torque of clamping motor 28 indicates an increase in the mold-opening force and a decrease in the margin of the retaining force relative to the set value.

In the case of "NO" in Step S1, controller 4 continues and completes the mold-opening step. In the case of "YES" in Step S1, controller 4 reduces the mold-opening speed and thereby reduces mold-opening force F1 (Step S2). Next, controller 4 judges whether the retaining force is greater than the set value (Step S3). When the motor torque of clamping motor 28 is referred to, controller 4 judges whether the motor torque is less than the second set value. In the case of "NO," the mold-opening speed and/or the motor torque of clamping motor 28 are changed and the same process is repeated. In the case of "YES," controller 4 continues and completes the mold-opening step.

As another measure for preventing detachment, an alarm may be outputted when the retaining force is reduced to less than the reference value for the alarm (refer to FIGS. 5A and 5B). The reference value for the alarm may be obtained, for example, by multiplying the retaining force when injection molding machine 1 starts operation (in the state in which magnetically pinned magnet 11 and magnetically variable magnet 12 are not heated) by a coefficient that is less than 1. Further, as yet another measure for preventing detachment, injection molding machine 1 may be halted when the retaining force is reduced to less than a reference value for halting that is less than the reference value for the alarm (refer to FIGS. 5A and 5B). These measures for preventing detachment may be performed irrespective of whether the feedback control of the separation force is performed.

Although certain preferred embodiments of the present invention have been shown and described in detail, it should be understood that various changes and modifications may be made without departing from the spirit or scope of the appended claims.

10

LIST OF REFERENCE NUMERALS 1 injection molding machine
3 injection unit
4 controller
9 clamp
16 measurement device
26 clamping mechanism
29 ejector pin drive mechanism
37 injection nozzle
C cavity
M1 moving plate
M2 fixed plate
M9 guide pin (sliding part)
M11 ejector pin

What is claimed is:
1. An injection molding machine comprising:
a clamp that generates an electromagnetic force and that secures a moving plate or a fixed plate to the clamp using an attractive force that is produced by the electromagnetic force;
a clamping mechanism that drives the moving plate;
a pressure sensor that is provided in the clamp, wherein the pressure sensor measures contact pressure that acts between (i) the moving plate or the fixed plate and (ii) the clamp; and
a controller configured to:
obtain a retaining force of the clamp from the contact pressure that is measured by the pressure sensor, and
control a mold-opening speed of the clamping mechanism such that a separation force that acts on the moving plate or the fixed plate is less than the retaining force to prevent detachment of the moving plate or the fixed plate from the clamp, wherein:
the separation force includes a mold-opening force that is generated in the moving plate or the fixed plate in a mold-opening step,
the moving plate has a sliding part that slides relative to the fixed plate and that thereby generates the mold-opening force, and
the controller controls the mold-opening speed of the moving plate such that the mold-opening force is less than the attractive force after a main body of the moving plate is separated from the fixed plate and until the sliding part is separated from the fixed plate.
2. The injection molding machine according to claim 1, further comprising an ejector pin drive mechanism that drives an ejector pin for pushing out a product from the moving plate, wherein:
the separation force includes an ejector pin reactive force that is generated in the moving plate when the ejector pin is operated, and
the controller controls the ejector pin drive mechanism such that the ejector pin reactive force is less than the attractive force.
3. The injection molding machine according to claim 1, further comprising:
an ejector pin drive mechanism that drives an ejector pin for pushing out a product from the moving plate, wherein:
the separation force is sum of the mold-opening force that is generated in the moving plate in the mold-opening step and an ejector pin reactive force that is generated in the moving plate when the ejector pin is operated, and the controller controls the clamping mechanism and the ejector pin drive mechanism such that the sum is less than the attractive force.

4. The injection molding machine according to claim 1, further comprising:

an injection nozzle for supplying material to be injected into a cavity that is formed by the moving plate and the fixed plate, and a nozzle touch mechanism that drives the injection nozzle, wherein:

the separation force includes a nozzle contact force that is generated in the fixed plate by the injection nozzle, and the controller controls the nozzle touch mechanism such that the nozzle contact force is less than the attractive force.

5. The injection molding machine according to claim 1, further comprising:

an injection nozzle for supplying material to be injected into a cavity that is formed by the moving plate and the fixed plate, and a nozzle touch mechanism that drives the injection nozzle, wherein:

the separation force is sum of the mold-opening force that is generated in the fixed plate in the mold-opening step and a nozzle contact force that is generated in the fixed plate by the injection nozzle, and the controller controls the clamping mechanism and the nozzle touch mechanism such that the sum is less than the attractive force.

6. The injection molding machine according to claim 1, wherein:

the pressure sensor measures the contact pressure at a specific timing in a molding process, and the controller is configured to obtain a temporal change of the retaining force based on the contact pressure that is measured by the pressure sensor.

7. The injection molding machine according to claim 6, wherein:

the controller obtains the retaining force based on the contact pressure that is measured by the pressure sensor, and the controller is configured to perform feedback-control based on the temporal change of the retaining force such that the retaining force is greater than the separation force.

8. An injection molding machine comprising:

a clamp that generates an electromagnetic force and that secures a moving plate or a fixed plate to the clamp using an attractive force that is produced by the electromagnetic force;

an ejector pin drive mechanism that drives an ejector pin for pushing out a product from the moving plate;

a pressure sensor that is provided in the clamp, wherein the pressure sensor measures contact pressure that acts between (i) the moving plate or the fixed plate and (ii) the clamp; and a controller configured to:

obtain a retaining force of the clamp from the contact pressure that is measured by the pressure sensor, and control the ejector pin drive mechanism to control a speed of the ejector pin such that a separation force that acts on the moving plate or the fixed plate is less than the retaining force to prevent detachment of the moving plate or the fixed plate from the clamp, wherein:

the separation force includes an ejector pin reactive force that is generated in the moving plate when the ejector pin is operated, and the controller controls the ejector pin drive mechanism such that the ejector pin reactive force is less than the attractive force.

9. The injection molding machine according to claim 8, further comprising:

a clamping mechanism that drives the moving plate, wherein:

the separation force is sum of a mold-opening force that is generated in the moving plate in a mold-opening step and the ejector pin reactive force that is generated in the moving plate when the ejector pin is operated, and the controller is configured to control the clamping mechanism and the ejector pin drive mechanism such that the sum is less than the attractive force.

10. The injection molding machine according to claim 8, further comprising:

an injection nozzle for supplying material to be injected into a cavity that is formed by the moving plate and the fixed plate, and a nozzle touch mechanism that drives the injection nozzle, wherein:

the separation force includes a nozzle contact force that is generated in the fixed plate by the injection nozzle, and the controller is configured to control the nozzle touch mechanism such that the nozzle contact force is less than the attractive force.

11. The injection molding machine according to claim 8, further comprising:

a clamping mechanism that drives the moving plate;

an injection nozzle for supplying material to be injected into a cavity that is formed by the moving plate and the fixed plate, and a nozzle touch mechanism that drives the injection nozzle, wherein:

the separation force is sum of a mold-opening force that is generated in the fixed plate in a mold-opening step, the ejector pin reactive force that is generated in the moving plate when the ejector pin is operated, and nozzle contact force that is generated in the fixed plate by the injection nozzle, and the controller is configured to control the clamping mechanism, the ejector pin drive mechanism, and the nozzle touch mechanism such that the sum is less than the attractive force.

12. The injection molding machine according to claim 8, wherein:

the pressure sensor measures the contact pressure at a specific timing in a molding process, and the controller is configured to obtain a temporal change of the retaining force based on the contact pressure that is measured by the pressure sensor.

13. The injection molding machine according to claim 12, wherein:

the controller obtains the retaining force based on the contact pressure that is measured by the pressure sensor, and the controller is configured to perform feedback-control based on the temporal change of the retaining force such that the retaining force is greater than the separation force.

14. An injection molding machine comprising:

a clamp that generates an electromagnetic force and that secures a moving plate or a fixed plate to the clamp using an attractive force that is produced by the electromagnetic force;

a pressure sensor that is provided in the clamp, wherein the pressure sensor measures contact pressure that acts between (i) the moving plate or the fixed plate and (ii) the clamp, wherein the pressure sensor measures the contact pressure at a specific timing in a molding process; and a controller configured to:

obtain a retaining force of the clamp from the contact pressure that is measured by the pressure sensor, and output an alarm when the retaining force is less than a reference value for the alarm.

15. The injection molding machine according to claim 14, wherein the controller is further configured to halt the injection molding machine when the retaining force is equal to or less than a reference value for halting that is less than the reference value for the alarm.

16. The injection molding machine according to claim 14, further comprising an ejector pin drive mechanism that drives an ejector pin for pushing out a product from the moving plate, wherein:

a separation force that acts on the moving plate or the fixed plate includes an ejector pin reactive force that is generated in the moving plate when the ejector pin is operated, and the controller is configured to control the ejector pin drive mechanism such that the ejector pin reactive force is less than the attractive force.

17. The injection molding machine according to claim 14, further comprising:

a clamping mechanism that drives the moving plate; and an ejector pin drive mechanism that drives an ejector pin for pushing out a product from the moving plate, wherein:

a separation force that acts on the moving plate or the fixed plate is a sum of a mold-opening force that is generated in the moving plate in a mold-opening step and an ejector pin reactive force that is generated in the moving plate when the ejector pin is operated, and the controller is configured to control the clamping mechanism and the ejector pin drive mechanism such that the sum is less than the attractive force.

18. The injection molding machine according to claim 14, further comprising:

an injection nozzle for supplying material to be injected into a cavity that is formed by the moving plate and the fixed plate, and a nozzle touch mechanism that drives the injection nozzle, wherein:

a separation force that acts on the moving plate or the fixed plate includes a nozzle contact force that is generated in the fixed plate by the injection nozzle, and the controller is configured to control the nozzle touch mechanism such that the nozzle contact force is less than the attractive force.

19. The injection molding machine according to claim 14, further comprising:

a clamping mechanism that drives the moving plate;

an injection nozzle for supplying material to be injected into a cavity that is formed by the moving plate and the fixed plate, and a nozzle touch mechanism that drives the injection nozzle, wherein:

a separation force that acts on the moving plate or the fixed plate is a sum of a mold-opening force that is generated in the fixed plate in a mold-opening step and nozzle contact force that is generated in the fixed plate by the injection nozzle, and the controller is configured to control the clamping mechanism and the nozzle touch mechanism such that the sum is less than the attractive force.

20. The injection molding machine according to claim 14, wherein the controller is configured to obtain a temporal change of the retaining force based on the contact pressure that is measured by the pressure sensor.

21. The injection molding machine according to claim 20, wherein:

the controller obtains the retaining force based on the contact pressure that is measured by the pressure sensor, and the controller is configured to perform feedback-control based on the temporal change of the retaining force such that the retaining force is greater than a separation force that acts on the moving plate or the fixed plate.

22. A method of operating an injection molding machine, wherein the injection molding machine comprises a clamp that generates electromagnetic force, a clamping mechanism, and a controller, wherein the clamp secures a moving plate or a fixed plate to the clamp using an attractive force that is produced by the electromagnetic force, wherein the clamping mechanism drives the moving plate, the method comprising the steps of:

using a pressure sensor to measure contact pressure that acts between (i) the moving plate or the fixed plate and (ii) the clamp;

using the controller to obtain a retaining force of the clamp from the contact pressure that is measured by the pressure sensor; and using the controller to control a mold-opening speed of the clamping mechanism such that a separation force that acts on the moving plate or the fixed plate is less than the retaining force to prevent detachment of the moving plate or the fixed plate from the clamp, wherein:

the separation force includes a mold-opening force that is generated in the moving plate or the fixed plate in a mold-opening step, the moving plate has a sliding part that slides relative to the fixed plate and that thereby generates the mold-opening force, and the controller is used to control the mold-opening speed of the moving plate such that the mold-opening force is less than the attractive force after a main body of the moving plate is separated from the fixed plate and until the sliding part is separated from the fixed plate.

23. A method of operating an injection molding machine, wherein the injection molding machine comprises a clamp that generates electromagnetic force, an ejector pin mechanism, and a controller, wherein the clamp secures a moving plate or a fixed plate to the clamp using an attractive force that is produced by the electromagnetic force, wherein the ejector pin mechanism drives an ejector pin for pushing out a product from the moving plate, the method comprising the steps of:

using a pressure sensor to measure contact pressure that acts between (i) the moving plate or the fixed plate and (ii) the clamp;

using the controller to obtain a retaining force of the clamp from the contact pressure that is measured by the pressure sensor; and using the controller to control the ejector pin mechanism to control a speed of the ejector pin such that a separation force that acts on the moving plate or the fixed plate is less than the retaining force to prevent detachment of the moving plate or the fixed plate from the clamp, wherein:

the separation force includes an ejector pin reactive force that is generated in the moving plate when the ejector pin is operated, and the controller controls the ejector pin mechanism such that the ejector pin reactive force is less than the attractive force.

24. A method of operating an injection molding machine, wherein the injection molding machine comprises a clamp that generates electromagnetic force and a controller, wherein the clamp secures a moving plate or a fixed plate to the clamp using an attractive force that is produced by the electromagnetic force, the method comprising the steps of:

using a pressure sensor to measure contact pressure that acts between (i) the moving plate or the fixed plate and (ii) the clamp, wherein the pressure sensor measures the contact pressure at a specific timing in a molding process;

using the controller to obtain a retaining force of the clamp from the contact pressure that is measured by the pressure sensor; and using the controller to output an alarm when the retaining force is less than a reference value for the alarm.

* * * * *